Patented July 3, 1934

1,964,867

UNITED STATES PATENT OFFICE 1,964,867

PRESERVATION OF VITAMINS

Lewis Benajah Allyn, Westfield, Mass., assignor to Vitamin Food Co. Inc., New York, N. Y., a corporation of Delaware No Drawing. Application May 3, 1928, Serial No. 274,977

13 Claims. (Cl. 99—11)

My invention relates to an improvement in the method for sealing vitamin concentrates so as to protect the vitamin potency from deterioration described and claimed in United States Patent 1,633,711, granted to Robert K. Prince, June 28, 1927. In that patent a process is described for sealing the A and D vitamins from cod liver oil and other sources into a mixture of yeast or other vegetable products with a gum solution.

When large quantities of oil are sealed as described in said patent, there is some leakage of the oil into the product and with this leakage, a diminishing of the vitamin content. I have discovered that when paraffin is used in connection with gum, the product can be produced that does not have this leakage and which does not show an oily consistency and which fully protects from rancidity and gives a better protection to the potency of the vitamins.

As an example of carrying out my invention, I make a solution as follows:

Kayara or other suitable gum_____ 5 pounds
Water_____ 24 pounds

I then take paraffin and melt it in a water bath and add to cod liver oil or other vitamin bearing oils at the rate of eight per cent of the paraffin to the weight of the oil and mix them together. I then mix together nine pounds of this gum solution and nine pounds of the mixture of paraffin and vitamin bearing oil and thirty-six pounds of dried brewers' yeast or dried yeast, dried soy bean meal, or other suitable vegetable or animal products or mixtures of these and then thoroughly intermix in a suitable mixer. I then add this to seventy-six pounds of dried brewers' yeast or dried yeast, soy bean meal, or other suitable vegetable or animal meals, thoroughly intermix and then dry so that the resultant product will contain less than eight per cent of water. The resulting product of the improved process herein described is a granular mass quite similar to the dried yeast or other vegetable substance before treatment, and may be handled in the same way at ordinary temperatures. When kept at a temperature below the melting point of the paraffin, leakage of the oil does not occur, and the product will retain its vitamin potency for a long period.

I do not confine myself to these proportions but simply give them as an example of the way in which this discovery can be carried out. It may be desirable in such mixtures intended for animal or human nutrition to put more of the yeast or of the vegetable or animal meals or less of the vitamin bearing oil and vice versa. I may also use a concentrate containing the A and D vitamins in which case the proportions of such a concentrate to the mixture would be proportionately less depending upon the degree of concentration and the vitamin content of the concentrate.

The word "paraffin" as used in the appended claims is used in the generic sense to include other suitable wax-like substances.

I claim:

1. A vitamin food product consisting of a granular vegetable substance rich in vitamin B impregnated with a mixture of oil rich in vitamin A and paraffin, the individual granules being coated with a film of edible air-excluding substance.

2. A vitamin food product consisting of granules of dried yeast, each granule being impregnated with a mixture of paraffin and an oil rich in vitamin A and coated with a film of Karaya gum.

3. A vitamin food product consisting of granules of dried yeast impregnated with a mixture of cod liver oil and paraffin and coated with a film of Karaya gum.

4. The method of producing a vitamin-containing foodstuff which consists in preparing a mixture of vitamin-bearing oil and paraffin, and impregnating a granular vitamin-containing vegetable foodstuff with said mixture and a solution of edible gum.

5. The method of producing a vitamin-containing foodstuff which consists in preparing a mixture of vitamin-bearing oil and paraffin, simultaneously impregnating a granular vitamin-containing vegetable foodstuff with said mixture and a solution of edible gum, and thereafter drying the product, whereby the gum solution forms an air-excluding film.

6. The method of producing a vitamin-containing foodstuff which consists in preparing a mixture of cod liver oil and paraffin, mixing the same with a water solution of Karaya gum, stirring into said mixture dried yeast in granular form, then drying the product, whereby the gum is left on the surface as an air-excluding film.

7. A food product of the class described consisting of a permeable substance impregnated with a wax-like material, such as paraffine, containing a vitamin-potent oil.

8. A food product of the class described comprising a permeable substance in granular form whose individual granules are impregnated with a wax-like material containing a vitamin-potent oil.

9. A food product of the class described comprising a granular vegetable substance the individual grains of which are permeated with a wax-like material, such as paraffine, containing a vitamin-potent oil.

10. A food product of the class described comprising dried yeast in granular form, the granules of which are permeated with a wax-like material, such as paraffine, containing a vitamin-potent oil.

11. A food product of the class described comprising a permeable substance in granular form whose individual units are impregnated with a solidified mixture of paraffine and a vitamin-containing oil.

12. The herein described method which consists in impregnating a permeable substance in granular form with a mixture of melted wax-like material and a vitamin-containing oil and allowing the resultant product to cool thereby to solidify the mixture.

13. A food product of the character described comprising a vitamin containing vegetable substance in granular form, the individual granules of such mixture being permeated with paraffine and cod liver oil.

LEWIS BENAJAH ALLYN.